(12) United States Patent
Balraj et al.

(10) Patent No.: US 9,564,957 B2
(45) Date of Patent: Feb. 7, 2017

(54) USER EQUIPMENT AND METHOD FOR ASSISTED THREE DIMENSIONAL BEAMFORMING

(71) Applicant: Intel Corporation, Santa Clara, CA (US)

(72) Inventors: Rajarajan Balraj, Nurmberg (DE); Biljana Badic, Munich (DE)

(73) Assignee: Intel Corporation, Santa Clara, CA (US)

(*) Notice: Subject to any disclaimer, the term of this patent is extended or adjusted under 35 U.S.C. 154(b) by 190 days.

(21) Appl. No.: 14/368,699

(22) PCT Filed: Dec. 16, 2013

(86) PCT No.: PCT/US2013/075322
§ 371 (c)(1),
(2) Date: Jun. 25, 2014

(87) PCT Pub. No.: WO2150/094155
PCT Pub. Date: Jun. 25, 2015

(65) Prior Publication Data
US 2016/0191131 A1    Jun. 30, 2016

(51) Int. Cl.
*H04B 7/06* (2006.01)
*H04B 7/04* (2006.01)
(Continued)

(52) U.S. Cl.
CPC .......... *H04B 7/0617* (2013.01); *H04B 7/0417* (2013.01); *H04B 7/063* (2013.01);
(Continued)

(58) Field of Classification Search
CPC ... H04B 7/0408; H04B 7/0421; H04B 7/0617; H04B 7/0417; H04B 7/0626; H04B 7/063; H04B 7/0413; H04B 7/0639; H04B 7/0632; H04W 72/042; H04W 72/04
(Continued)

(56) References Cited

U.S. PATENT DOCUMENTS 8,885,752 B2 * 11/2014 Shirani-Mehr ...... H04B 7/0469
375/267
9,215,755 B2 * 12/2015 Saur ...................... H04W 88/08
(Continued)

FOREIGN PATENT DOCUMENTS

CN        105706376 A    6/2016
KR   1020080089522 A   10/2008
(Continued)

OTHER PUBLICATIONS

"International Application Serial No. PCT/US2013/075322, International Preliminary Report on Patentability mailed Jun. 30, 2016", 8 pgs.
(Continued)

*Primary Examiner* — Siu Lee
(74) *Attorney, Agent, or Firm* — Schwegman Lundberg & Woessner, P.A.

(57) ABSTRACT

An embodiment for a method for user equipment assisted three-dimensional beamforming is disclosed. The method may include the user equipment receiving a reference signal from an eNodeB comprising an antenna. The user equipment may then calculate an optimum antenna tilt for the antenna and transmit feedback to the base station. The feedback may include an indication of the optimum antenna tilt for the antenna. Additional signals may be received from the base station after a transmit angle of the antenna has been adjusted in response to the optimum antenna tilt.

22 Claims, 4 Drawing Sheets

(51) Int. Cl.
*H04L 5/00* (2006.01)
*H04W 72/04* (2009.01)

(52) U.S. Cl.
CPC ......... *H04B 7/0695* (2013.01); *H04L 5/0048* (2013.01); *H04W 72/042* (2013.01)

(58) Field of Classification Search
USPC ............... 375/267, 259, 260, 295, 296, 299, 316,375/347, 349
See application file for complete search history.

(56) References Cited

U.S. PATENT DOCUMENTS

| | | | | |
|---|---|---|---|---|
| 2011/0258699 | A1* | 10/2011 | Zugenmaier | H04B 7/0626 726/22 |
| 2012/0106388 | A1* | 5/2012 | Shimezawa | H04B 7/024 370/252 |
| 2013/0244668 | A1 | 9/2013 | Eckhardt | |
| 2013/0259151 | A1 | 10/2013 | Thomas et al. | |
| 2015/0029875 | A1* | 1/2015 | Zhu | H04W 76/02 370/252 |
| 2015/0105025 | A1* | 4/2015 | Zhang | H01Q 3/26 455/63.4 |
| 2015/0381252 | A1* | 12/2015 | Kang | H04B 7/024 370/329 |
| 2016/0050002 | A1* | 2/2016 | Wei | H04B 7/0469 370/329 |

FOREIGN PATENT DOCUMENTS

| | | |
|---|---|---|
| KR | 1020090012287 A | 2/2009 |
| WO | WO-2013181850 A1 | 12/2013 |
| WO | WO-2015094155 A1 | 6/2015 |

OTHER PUBLICATIONS

"International Application Serial No. PCT/US2013/075322, International Search Report mailed Sep. 15, 2014", 3 pgs.
"International Application Serial No. PCT/US2013/075322, Written Opinion mailed Sep. 15, 2014", 6 pgs.

* cited by examiner

USER EQUIPMENT AND METHOD FOR ASSISTED THREE DIMENSIONAL BEAMFORMING

This application is a U.S. National Stage Filing under 35 U.S.C. §371 from International Patent Application Serial No. PCT/US2013/075322, filed on Dec. 16, 2013, the benefit of priority of which is claimed hereby, and is incorporated by reference herein in its entirety.

TECHNICAL FIELD

Embodiments described herein generally relate to wireless networks. Some embodiments relate generally to user equipment assisted beamforming in a wireless network.

BACKGROUND

Wireless networks may enable mobile devices (e.g., radiotelephones, cellular telephones, user equipment (UE)) to communicate within that network with a fixed landline infrastructure (e.g., base stations, radio access network (RAN)). For example, in a cellular mobile network, user equipment may communicate with a fixed base station over a wireless channel.

Various standards (e.g., $3^{rd}$ Generation Partnership Project Long Term Evolution (3GPP LTE)) regarding multiple-input multiple-output (MIMO) enhancements may be designed to support antenna configurations at the evolved node B (eNodeB) that may be capable of adaptation in azimuth only. Thus, the elevation dimension in these standards may be ignored. This may cause performance problems when the UE may be physically close to the antenna tower (e.g., below the eNodeB antenna) or on a building (e.g., above the eNodeB antenna).

There are general needs for improving system performance in a wireless network.

DETAILED DESCRIPTION

Wireless standards such as relatively recent releases of 3GPP Long Term Evolution (LTE) (e.g., Release 8 MIMO and MIMO enhancements in Release 10 and Release 11) may be designed to support antenna configurations at the evolved node B (eNodeB) that may be capable of adaptation in azimuth only. Thus, these communication techniques may ignore the elevation dimension. This may result in system performance problems when the user equipment (UE) (e.g., mobile communication device) is out of the plane of transmission. For example, when the UE is located close to an antenna, the plane of transmission from the eNodeB is going to be above the UE.

System performance may be enhanced using three dimensional (3D) multiple input/multiple output (MIMO) beamforming. An LTE codebook feedback method may be used to control the azimuth dimension of the eNodeB. UE assisted 3D beamforming may be used to control the elevation dimension by the UE feeding back an optimal antenna tilt and respective differential Reference Signal Received Power/Reference Signal Received Quality (RSRP/RSRQ) for each of the serving transmission points along with Pre-coding Matrix Indicator/Channel Quality Indicator/Rank Indicator (PMI/CQI/RI) feedback (e.g., Channel State Information-Reference Signal (CSI-RS)-feedback). Such feedback may use reference signals, such as elevation reference signals (E-RS), to facilitate the UE in antenna tilt selection. This may be used in both single and multiple cell MIMO systems as described subsequently. As discussed subsequently, the E-RS may be represented by an angle for the antenna tilt as determined by the subsequent calculations.

Subsequent embodiments are discussed in relation to a cellular wireless network. However, the present embodiments are not limited to user assisted 3D beamforming in any one type of wireless network. For example, the present embodiments may be used in a Wi-Fi system.

Subsequent references to an "optimal antenna tilt" or "optimal antenna tilt data" may be defined as a particular antenna transmission tilt that produces the highest data throughput out of a plurality of antenna tilts. The data throughput may be measured on a channel between the user equipment and a base station (e.g., eNodeB).

Figure 1:
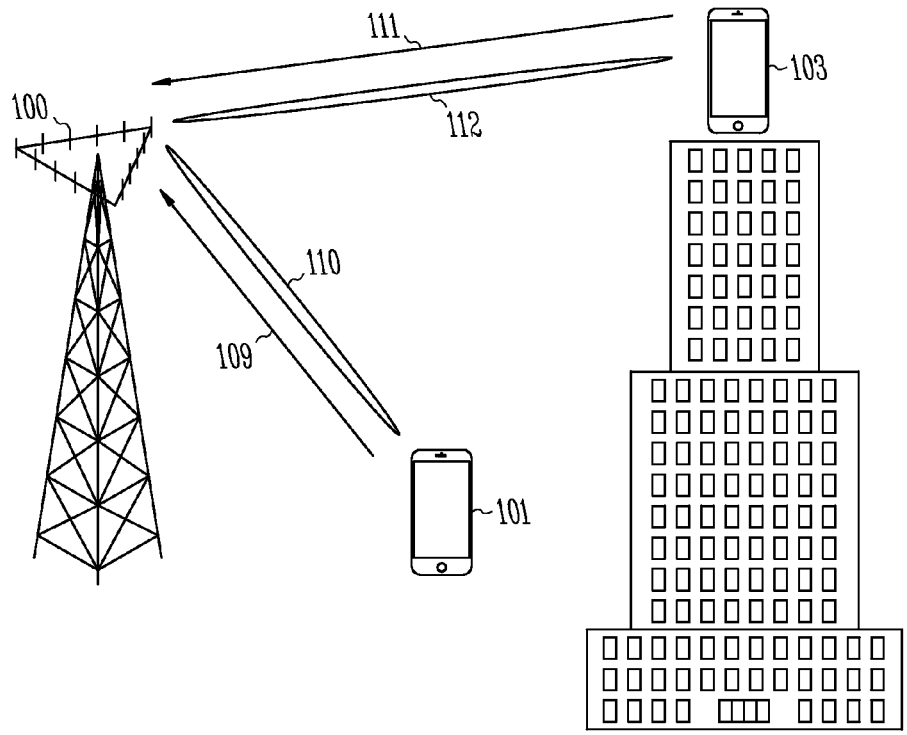
FIG. 1 illustrates a diagram of an embodiment of user equipment assisted three-dimensional beamforming in a single cell environment.

FIG. 1 illustrates a diagram of UE in a communication system with a single cell. The communication system illustrated includes a cell site base station equipped with an antenna array 100 (e.g., eNodeB) and two different UEs: UE1 101 and UE2 103.

UE1 101 is shown in a geographical location that is relatively close to the antenna array 100. Thus, UE1 101 may be below the plane of optimal communication with the antenna array 100 without 3D beamforming UE2 103 is shown on a floor of a building that may be above the plane of optimal communication with the antenna array 100 without 3D beamforming. The eNodeB transmits a common E-RS. Both UE 101 and 102 estimates the desired antenna tilt based on the received E-RS and transmits the desired antenna tilt to the eNodeB. The eNodeB may apply the desired antenna tilts at antenna array 100 to direct future communications with that particular UE 101, 103. The antenna tilt may be either a physical tilt of the antenna or an electronic beamforming of the antenna.

The eNodeB, through antenna 100, may initially transmit one or more reference signals to UE1 101. UE1 may use that reference signal to calculate an optimal antenna tilt feedback signal 109 to be transmitted to the antenna 100 for the eNodeB. The optimal tilt feedback signal calculations, described subsequently, may be based on E-RS, PMI/CQI/RI based on CSI-RS or CRS. The differential RSRP/RSRQ may be calculated between E-RS and CSI-RS or between E-RS and CRS. In either embodiment, UE1 101 may send that feedback signal to the eNodeB.

The eNodeB, through antenna 100, may initially transmit one or more reference signals to UE2 103. UE2 may use that reference signal to calculate the optimal antenna tilt feedback signal 111 to be transmitted to the antenna 100 for the eNodeB. As in the down tilt embodiment of UE1 101, the up tilt embodiment's optimal antenna tilt feedback signal calculations may be based on the E-RS as well as PMI/CQ/RI based on CSI-RS or CRS and the differential RSRP/RSRQ may be between E-RS and CRS or between E-RS and CSI-RS.

It may be noted that both UE1 101 and UE2 103 E-RS signals are cell specific. This is substantially similar to the CSI-RS and CRS that may be transmitted to the eNodeB. Additionally, the optimal antenna tilt feedback may be either codebook based or non-codebook based.

In both UE1 101 and UE2 103 embodiments, the eNodeB may receive the optimal antenna tilt feedback signals from one or both of UE1 101 and/or UE2 103. The eNodeB may then perform 3D beamforming and adapt its vertical antenna tilt differently for each specific UE 101, 103 based on the respective feedback signals received from the respective UE 101, 103.

FIG. 1 illustrates that the antenna down tilt may be implemented on further communications 110 with UE1 101 as applied on UE specific signals such as Demodulation Reference Signals (DMRS), Physical Downlink Shared Channel (PDSCH), and/or enhanced Physical Downlink Control Channel (ePDCCH). Similarly, further communications 112 with UE2 103 may be implemented as applied on the UE specific signals. Other embodiments may implement the vertical antenna tilt communications on other communication signals to the UE 101, 103.

Figure 2:
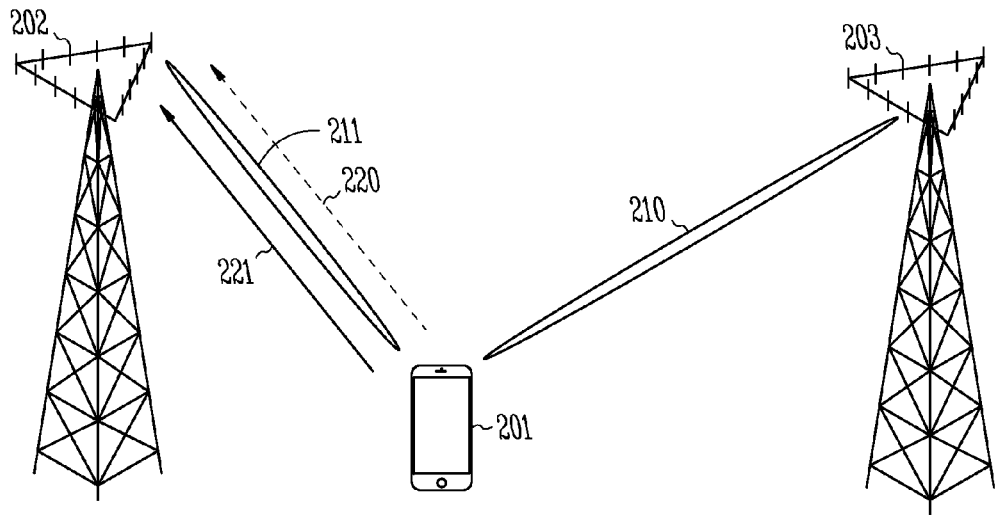
FIG. 2 illustrates a diagram of an embodiment of user equipment assisted three-dimensional beamforming in a multiple cell environment.

FIG. 2 illustrates a diagram of an embodiment of three-dimensional beamforming in a multiple cell environment (e.g., cooperative multi-point network). The illustrated communication system includes a first antenna 202 for a first eNodeB and a second antenna 203 for a second eNodeB.

Due to its different proximity to each of the antennas 202, 203, the UE 201 may need a different optimal down tilt from each of the antennas 202, 203. For example, the UE 201 is shown located geographically closer to the first antenna 202 than the second antenna 203. Thus, the UE 201 may benefit from a greater down tilt on the first antenna 202 than on the second antenna 203.

In a multiple cell environment, an eNodeB for one of the plurality of cells may be considered an anchored eNodeB in that the UE 201 may be registered with the anchored eNodeB (e.g., serving eNodeB) and do all or most of its communication with the anchored eNodeB. The anchored eNodeB may transmit the optimal antenna tilt feedback information, received from the UE 201, to the other eNodeBs 203 in the system.

Referring to FIG. 2, the UE 201 may receive respective reference signals 210, 211 from each antenna 202, 203. However, the UE 201 may be registered with the cell site having the first antenna 202. The UE 201 may calculate respective optimal antenna tilt feedback signals based on each of the received reference signals. The UE 201 may then transmit the optimal antenna tilt feedback signal 221 meant for the first eNodeB to the first antenna 202 of the first eNodeB and separately transmit the optimal antenna tilt feedback signal 220 meant for the second eNodeB also to the first antenna 202 of the first eNodeB (e.g., anchor eNodeB). The anchor eNodeB may then forward the optimal antenna tilt information to the second eNodeB. This may be accomplished through either a wired or wireless channel.

In order to perform the 3D beamforming, an eNodeB may employ Active Antenna Systems (AAS) where each logical antenna port AP may employ an array comprising $N_P$ physical antennas. The logical antenna port typically seen by the UE may then be a linear combination of physical antennas corresponding to the antenna port AP. The vertical beams may be generated for each logical antenna port by using an $N_P \times 1$ vector.

A typical solution for the UE to determine the antenna tilt may be to send reference signals for each physical antenna in all of the antenna ports. For example, for an AAS with four logical antenna ports and eight physical antenna ports, the eNodeB may need to send 32 reference signals ($N_{AP} \times N_P$). Such a solution may cause an unacceptable overhead increase with the eNodeB supporting more logical ports or more physical antenna.

Since beamforming in the vertical direction may be based on the physical antennas and beamforming in the azimuth direction, the reference signals for PMI/CQI and RI calculations (CSI-RS or CRS) as well as the antenna tilt calculation using E-RS, may be separated. The eNodeB may then send the E-RS in a way such that the channel estimated by the UE using E-RS may result in the following determined channel G:

$$G = \left[ \frac{1}{N_{AP}} \sum_{i=1}^{N_{AP}} H_{1,i} \quad \cdots \quad \frac{1}{N_{AP}} \sum_{i=1}^{N_{AP}} H_{P,i} \right]$$

where,

G is the composite channel seen by the UE on E-RS and is of dimension $N_{Rx} \times N_P$;

$N_{AP}$ is the number of logical antenna ports;

$N_P$ is the number of physical antennas per logical antenna port;

$N_{Rx}$ is the number of receive antennas; and $H_{j,i}$ is the downlink channel between a physical antenna j belonging to antenna port i and is of dimension $N_{Rx} \times 1$.

The composite channel G is a result of averaging over all azimuth antennas (antenna ports) for a physical antenna. In order to enable the UE to experience such a composite channel, the eNodeB in an E-RS subcarrier dedicated to a physical antenna j may need to send the same reference signals for the physical antennas j belonging to all antenna ports ($1 \ldots N_{AP}$). Thus, the present embodiments enable the eNodeB only needs to send E-RS for $N_P$ antennas so that the total overhead, including CSI-RS or CRS with $N_C$ cooperating transmission points, results in $(N_{AP}+N_P)N_C$ instead of $(N_{AP} \times N_P)N_C$.

In a network where non-codebook based feedback is configured, the UE may determine an un-quantized antenna tilt vector $\alpha$ as follows. The antenna tilt vector $\alpha$ is the Eigenvector corresponding to a maximum Eigenvalue of covariance of the composite channel (estimated by the UE using E-RS). In an embodiment, the antenna tilt feedback from the UE is a (either quantized or un-quantized).

$R_G = E[G^H G]$ $\alpha_T = \max\{\text{eig}(R_G)\}$ where, $\alpha_T$ is the tilt vector and is the Eigenvector corresponding to the maximum Eigenvalue of $R_G$;

G is the composite channel from E-RS;

$G^H$ is a conjugate transpose of G; and $R_G$ is the covariance of the composite channel estimated using E-RS.

In a network where codebook-based feedback is configured, the UE may determine the optimal antenna tilt a belonging to a codebook, as in the following equation. In this configuration, the antenna tilt feedback by the UE may be the tilt vector index (TVI). Thus, the optimal antenna tilt T may be chosen as $\max(G_T^H G_T)$ where $T \in [1 \ldots N_T]$ and $$G_T = \begin{bmatrix} \alpha_T^H G_1 \\ \vdots \\ \alpha_T^H G_{N_{Rx}} \end{bmatrix}$$

where, $\alpha_T$ is the antenna tilt vector belonging to a codebook consisting of $N_T$ antenna tilt vectors;

$G_T$ is the effective channel due to antenna tilt vector $\alpha_T$; and $G_1$ is the composite channel from E-RS for receive antenna 1.

In both codebook and non-codebook-based feedback, the UE may determine a differential RSRP/RSRQ based on CSI-RS and E-RS, as in the following equation. It may be noted that the differential RSRP/RSRQ may be feedback by the UE that would enable the eNodeB scheduler to better estimate the gain due to the vertical beamforming (for better link adaption).

$$RSRP/RSRQ_{differential} = 10 \times \log_{10}\left(\frac{\sigma_{G_T}^2}{\sigma_{CSI\text{-}RS}^2}\right)$$

where, $\sigma_{G_T}^2$ is the power measured on E-RS based on optimal tilt; and $\sigma_{CSI\text{-}RS}^2$ is the power measured on CSI-RS or CRS.

Figure 3:
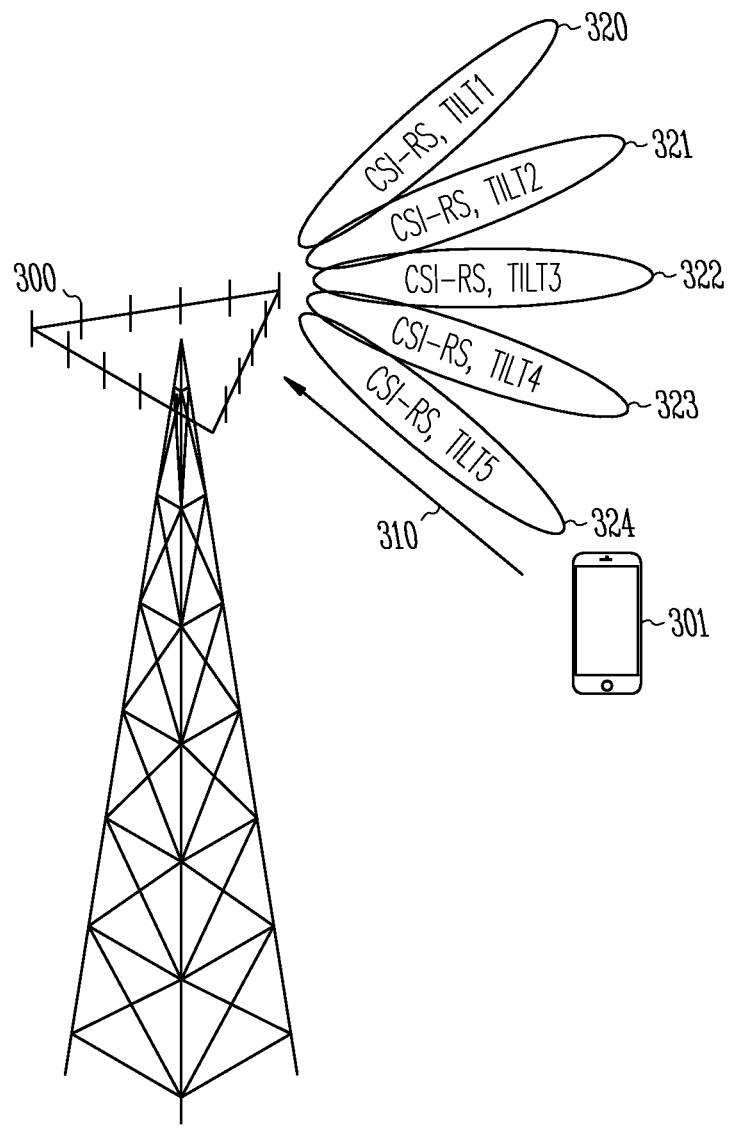
FIG. 3 illustrates a diagram of an embodiment of user equipment assisted three-dimensional beamforming including a plurality of different vertical antenna tilts.

FIG. 3 illustrates a diagram of an embodiment of three-dimensional beamforming including a plurality of different vertical antenna tilts. In such an embodiment, the UE 301 may determine Precoding Matrix Index (PMI), Channel Quality Indicator (CQI) and Rank Indicator (RI) for each set of CSI-RS transmissions from the eNodeB and respond with feedback 310 to the eNodeB with the specific antenna tilt data that provides the highest data throughput.

In such an embodiment, the eNodeB antenna 300 may transmit a set of CSI-RS reference signals 320-324 over a channel to the UE 301, each CSI-RS 320-324 may have different antenna tilt (e.g., Tilt1-Tilt5) data. The set of CSI-RS 320-324 and antenna tilts may be received by the UE 301. The reference signals may be sent in a same sub-frame or in different sub-frames.

The eNodeB may inform the UE 301 in the network, via a dedicated higher layer signaling or through a System Information Broadcast (SIB), of a number of CSI-RS parameters. These parameters can include the quantity ($N_t$) of CSI-RS's that have different antenna tilts. This parameter may correspond to the number of CSI-RS transmitted with different antenna tilts. Another parameter may be the information of time and/or frequency direction positions of the $N_t$ CSI-RS that are to be used by the UE for feedback calculation and PDSCH rate matching.

Another CSI-RS parameter may be an antenna tilt restriction denoted as "$t_{rest}$". This parameter may be a bitmap indicating a particular restricted CSI-RS (transmitted with specific antenna tilts) that is not to be used by the UE for feedback calculations.

Yet another CSI-RS parameter may be a request for UE feedback of specific antenna tilts only. This may be denoted as "$t_{spec}$" and sent to the UE for the feedback configuration for those specific antenna tilts.

The UE may calculate the PMI/CQI/RI for each of the valid CSI-RS within the CSI-RS set. The UE may then report the CSI-RS within the set that maximizes data throughput. The feedback may be in the form of an index that directly informs the eNodeB about the specific optimal antenna tilt. Additionally, the UE may also transmit the calculated PMI/CQI/RI conditioned on the optimal CSI-RS to the eNodeB. The eNodeB may employ the received optimal antenna tilt on the user specific signals such as DMRS, PDSCH, and/or ePDCCH for transmission for a particular UE.

The above described embodiments may provide the eNodeB with the ability to configure and control the antenna tilts that are used in the network. This may be taken into account during cell planning. By providing the above described feedback, the UE may assist the network in selecting an optimal antennal tilt for that particular UE. The reported PMI may be conditioned on the optimal antenna tilt. This enables the UE to jointly optimize the feedback calculation in azimuth. The CQI transmitted to the eNodeB may be conditioned on the optimal antenna tile that reflects the SINR gain due to 3D beamforming and, hence, enables the eNodeB to perform more accurate link adaptation.

Figure 4:
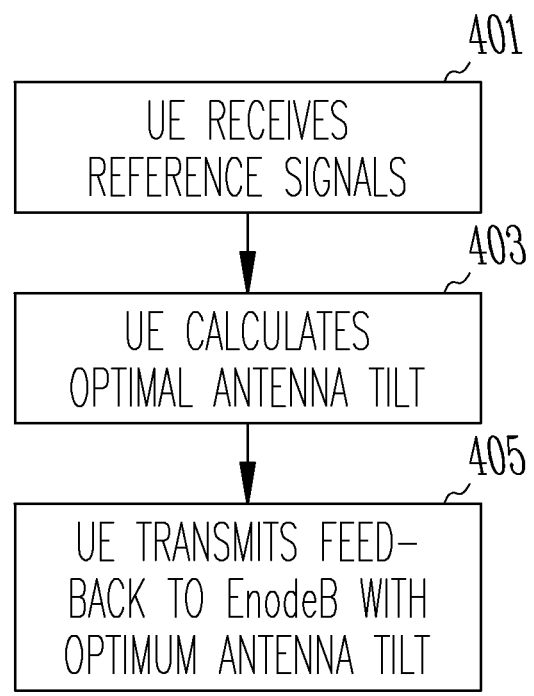
FIG. 4 illustrates a flowchart of an embodiment of user equipment assisted three-dimensional beamforming.

FIG. 4 illustrates a flowchart of an embodiment of UE assisted 3D beamforming in a wireless network. The UE may receive one or more reference signals 401 from a base station (e.g., eNodeB). The UE may then calculate an optimal antenna tilt based on the reference signal 403. The UE may use one of the above described embodiments for determining the optimal antenna tilt for beamforming of further communication with the UE. The UE may then transmit feedback to the base station (e.g., eNodeB) that includes an indication (e.g., tilt angle, tilt vector) of the optimum antenna tilt 405. After receiving the indication of the optimum antenna tilt, the base station may adjust its antenna azimuth and the UE may receive beamformed additional signals from the base station.

Figure 5:
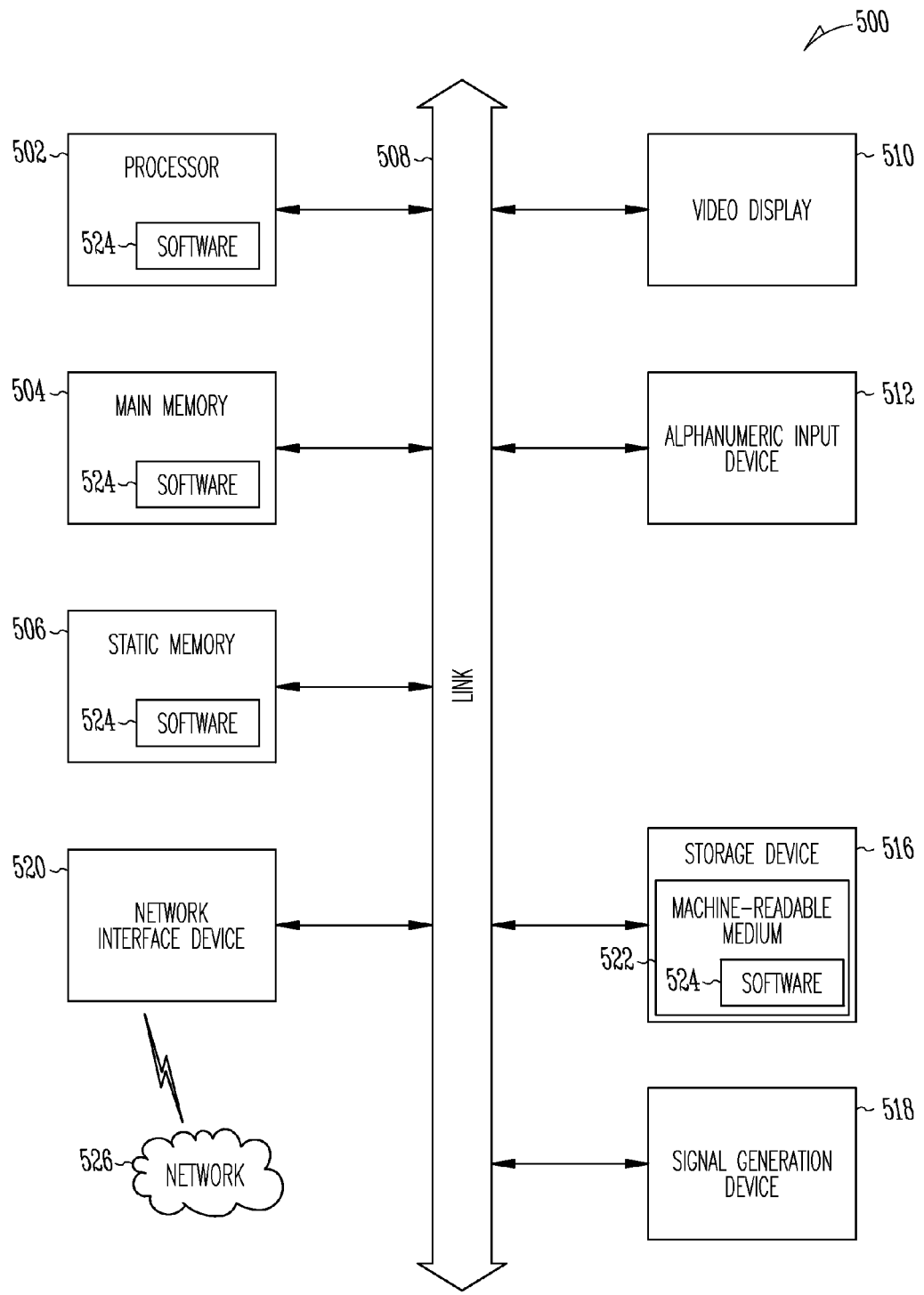
FIG. 5 illustrates a block diagram of an embodiment of user equipment.

FIG. 5 is a block diagram illustrating a machine in the example form of user equipment 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a mobile communication device (e.g., cellular telephone), a computer, a personal computer (PC), a tablet PC, a hybrid tablet, a personal digital assistant (PDA), or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example user equipment 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The user equipment 500 may further include a video display unit 510 and an alphanumeric input device 512 (e.g., a keypad). In one embodiment, the video display unit 510 and input device 512 are incorporated into a touch screen display. The user equipment 500 may additionally include a storage device 516 (e.g., a drive unit), a signal generation device 518 (e.g., a speaker), a network interface device 520, and one or more sensors (not shown).

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the user equipment 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WI-FI™, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software. The network interface device may include one or more antennas for communicating with the wireless network.

Examples

The following examples pertain to further embodiments.

Example 1 is a method for user equipment (UE) assisted three-dimensional beamforming comprising: the UE receiving a reference signal from a base station comprising, the base station comprising an antenna; calculating an optimum antenna tilt for the antenna; transmitting feedback to the base station, the feedback including an indication of the optimum antenna tilt for the antenna; and receiving additional signals from the base station that have been beamformed based on a transmit angle of the antenna having been adjusted in response to the optimum antenna tilt.

In Example 2, the subject matter of Example 1 can optionally include wherein the reference signal comprises a cell-specific reference signal (CRS) or a channel-state information reference signal (CSI-RS).

In Example 3, the subject matter of Examples 1-2 can optionally include the UE receiving an elevation reference signal (E-RS) from the base station.

In Example 4, the subject matter of Examples 1-3 can optionally include wherein transmitting feedback to the base station, wherein the feedback comprises an antenna tilt vector $\alpha_T$.

In Example 5, the subject matter of Examples 1-4 can optionally include determining $\alpha_T$ by determining an Eigenvalue of covariance of a composite channel estimated by the UE using E-RS.

In Example 6, the subject matter of Examples 1-5 can optionally include $\alpha_T$ by $\alpha_T = \max\{eig(R_G)\}$ where $R_G = E[G^H G]$, G is a composite channel from E-RS, $G^H$ is a conjugate transpose of G, and $R_G$ is the covariance of the composite channel, $\alpha_T$ is the tilt vector and is the Eigenvector corresponding to the maximum Eigenvalue of $R_G$ In Example 7, the subject matter of Examples 1-6 can optionally include wherein receiving the additional signals from the base station after a transmit angle of the antenna has been adjusted in response to the optimum antenna tilt comprises receiving Demodulation Reference Signals (DMRS), Physical Downlink Shared Channel (PDSCH), and/or enhanced Physical Downlink Control Channel (ePDCCH) signals on which the optimum antenna tilt has been applied.

In Example 8, the subject matter of Examples 1-7 can optionally include wherein the user equipment receiving the reference signal comprises the user equipment receiving a plurality of sets of Channel State Information-Reference Signals (CSI-RS), each set comprising different antenna tilt data.

In Example 9, the subject matter of Examples 1-8 can optionally include wherein transmitting the feedback to the base station comprises: the user equipment determining which antenna tilt data results in a higher data throughput; and the user equipment transmitting the antenna tilt data resulting in the higher data throughput to the base station.

In Example 10, the subject matter of Examples 1-9 can optionally include wherein receiving the plurality of sets of CSI-RS comprises receiving a single sub-frame including the plurality of sets of CSI-RS.

In Example 11, the subject matter of Examples 1-10 can optionally include wherein receiving the plurality of sets of CSI-RS comprises receiving a plurality of sub-frames, each sub-frame including a set of CSI-RS.

Example 12 is a machine-readable storage medium that stores instructions for user equipment assisted three-dimensional beamforming in a network, operations of the user equipment assisted three-dimensional beamforming: receive a reference signal from an eNodeB comprising an antenna; calculate an optimum antenna tilt for the antenna in response to the reference signal; transmit feedback to the eNodeB, the feedback including an indication of the optimum antenna tilt for the antenna; and receive additional signals from the eNodeB that have been beamformed based on a transmit angle of the antenna having been adjusted in response to the optimum antenna tilt.

In Example 13, the subject matter of Example 12 can optionally include wherein the operations further calculate Pre-coding Matrix Indicator/Channel Quality Indicator/Rank Indicator (PMI)/(CQI)/(RI), conditioned on an optimal Channel State Information-Reference Signal (CSI-RS), for each received referenced signal.

In Example 14, the subject matter of Examples 12-13 can optionally include wherein the operation that receives a reference signal from the serving eNodeB comprising an antenna further receives a respective reference signal from each of a plurality of eNodeBs.

In Example 15, the subject matter of Examples 12-14 can optionally include wherein the eNodeB is an anchor eNodeB of the plurality of eNodeBs and the operations further transmit feedback to only the anchor eNodeB of the plurality of eNodeBs.

In Example 16, the subject matter of Examples 12-15 can optionally include wherein the operation to transmit feedback to the eNodeB comprises further operations to: determine a respective differential Reference Signal Received Power/Reference Signal Received Quality (RSRP/RSRQ) for each of the plurality of eNodeBs; and transmit the differential RSRP/RSRQ to the eNodeB.

In Example 17, the subject matter of Examples 12-16 can optionally include wherein the operations further determine $$RSRP/RSRQ_{differential} = 10 \times \log_{10}\left(\frac{\sigma_{G_T}^2}{\sigma_{CSI-RS}^2}\right)$$

where $\sigma_{G_T}^2$ is a power measured on an elevation-reference signal (E-RS) based on an optimal tilt; and $\sigma_{CSI-RS}^2$ is a power measured on Channel State Information-Reference Signal (CSI-RS) or cell-specific signals (CRS).

Example 18 is user equipment for operating in a wireless network, the user equipment comprising: a network interface device to communicate with a base station having an antenna, the network interface device to receive a reference signal from the base station; and a processor coupled to the network interface to control operation of the user equipment, the operation including calculating an optimum antenna tilt for the antenna and transmitting feedback to the base station, the feedback including a beamforming indication of an indication of the optimum antenna tilt for the antenna.

In Example 19, the subject matter of Example 18 can optionally include wherein the user equipment is a cellular telephone for operating in a 3rd Generation Partnership Project Long Term Evolution (3GPP LTE)) network having multiple-input multiple-output (MIMO) enhancements.

In Example 20, the subject matter of Examples 18-19 can optionally include wherein the processor further controlling the operation of transmitting an antenna angle to the base station.

In Example 21, the subject matter of Examples 18-20 can optionally include wherein the processor is further to determine the optimum antenna tilt based on data throughput between the user equipment and the base station.

In Example 22, the subject matter of Examples 18-21 can optionally include wherein the processor is further to determine the optimum antenna tilt based on respective differential Reference Signal Received Power/Reference Signal Received Quality (RSRP/RSRQ) for each of a plurality of base stations.

In Example 23, the subject matter of Examples 18-22 can optionally include wherein the processor is further to determine the optimum antenna tilt based on an un-quantized antenna tilt vector α where α is an Eigenvector corresponding to a maximum Eigenvalue of covariance of a composite channel as estimated by the processor using an elevational-reference signal (E-RS).

Example 24 is a system for operation in a wireless network, the system comprising: a network interface device, including an antenna, to communicate with a base station having antennas, the network interface device to receive a reference signal from the base station; memory to store data received from the base station; and a processor, coupled to the network interface and the memory, to control operation of the system, the operation including calculating an optimum antenna tilt for the base station antennas and transmitting feedback to the base station to enable beamforming of the base station antennas for further communication with the system, the feedback including an indication of the optimum antenna tilt for the base station antennas.

In Example 25, the subject matter of Example 24 can optionally include wherein the reference signal comprises a cell-specific reference signal (CRS), Channel State Information-Reference Signals (CSI-RS), or an elevation reference signal (E-RS).

What is claimed is:

1. A method for user equipment (UE) assisted three-dimensional beamforming comprising:
   the UE receiving a reference signal from a base station comprising, the base station co rising an antenna;
   calculating an optimum antenna tilt for the antenna based on a differential Reference Signal Received Power/Reference Signal Received Quality (RSRP/RSRQ) for the base station;
   transmitting feedback to the base station, the feedback including an indication of the optimum antenna tilt for the antenna; and
   receiving additional signals from the base station that have been beamformed based on a transmit angle of the antenna having been adjusted in response to the optimum antenna tilt.

2. The method of claim 1 wherein the reference signal comprises a cell-specific reference signal (CRS) or a channel-state information reference signal (CSI-RS).

3. The method of claim 1 further comprising the UE receiving an elevation reference signal (E-RS) from the base station.

4. The method of claim 3 wherein transmitting feedback to the base station, wherein the feedback comprises an antenna tilt vector $\alpha_T$.

5. The method of claim 4 further comprising determining $\alpha_T$ by determining an Eigenvalue of covariance of a composite channel estimated by the UE using E-RS.

6. The method of claim 4 further comprising determining $\alpha_T$ by $\alpha_T = \max\{eig(R_G)\}$ where $R_G = E[G^H G]$, G is a composite channel from E-RS, $G^H$ is a conjugate transpose of G, and $R_G$ is the covariance of the composite channel, $\alpha_T$ is the tilt vector and is the Eigenvector corresponding to the maximum Eigenvalue of $R_G$.

7. The method of claim 1 wherein receiving the additional signals from the base station after a transmit angle of the antenna has been adjusted in response to the optimum antenna tilt comprises receiving Demodulation Reference Signals (DMRS), Physical Downlink Shared Channel (PDSCH), and/or enhanced Physical Downlink Control Channel (ePDCCH) signals on which the optimum antenna tilt has been applied.

8. The method of claim 1 wherein the user equipment receiving the reference signal comprises the user equipment receiving a plurality of sets of Channel State Information-Reference Signals (CSI-RS), each set comprising different antenna tilt data.

9. The method of claim 8 wherein transmitting the feedback to the base station comprises:
the user equipment determining which antenna tilt data results in a higher data throughput; and
the user equipment transmitting the antenna tilt data resulting in the higher data throughput to the base station.

10. The method of claim 8 wherein receiving the plurality of sets of CSI-RS comprises receiving a single sub-frame including the plurality of sets of CSI-RS.

11. The method of claim 8 wherein receiving the plurality of sets of CSI-RS comprises receiving a plurality of sub-frames, each sub-frame including a set of CSI-RS.

12. A non-transitory machine-readable storage medium that stores instructions for user equipment assisted three-dimensional beamforming in a network, operations of the user equipment assisted three-dimensional beamforming:
receive a respective reference signal from a serving eNodeB of a plurality of eNodeBs each comprising a respective antenna;
determine a respective differential Reference Signal Received Power/Reference Signal Received Quality (RSRP/RSRQ) for the plurality of eNodeBs;
calculate a respective optimum antenna tilt for the antenna based on each respective reference signal and each respective differential RSRP/RSRQ for the plurality of eNodeBs;
transmit feedback to the respective eNodeB, the feedback including an indication of the optimum antenna tilt for the antenna and the respective differential RSRP/RSRQ for the serving eNodeB; and
receive additional signals from the eNodeB that have been beamformed based on a transmit angle of the antenna having been adjusted in response to the optimum antenna tilt.

13. The non-transitory machine-readable storage medium of claim 12 wherein the operations further calculate Precoding Matrix Indicator/Channel Quality Indicator/Rank Indicator (PMI)/(CQI)/(RI), conditioned on an optimal Channel State Information-Reference Signal (CSI-RS), for each received referenced signal.

14. The non-transitory machine-readable storage medium of claim 12 wherein the eNodeB is an anchor eNodeB of the plurality of eNodeBs and the operations further transmit feedback to only the anchor eNodeB of the plurality of eNodeBs.

15. The non-transitory machine-readable storage medium of claim 12 wherein the operations further determine $$RSRP/RSRQ_{differential} = 10 \times \log_{10}\left(\frac{\sigma^2_{G_T}}{\sigma^2_{CSI-RS}}\right)$$

where $\sigma_{G_T}^2$ is a power measured on an elevation-reference signal (E-RS) based on an optimal tilt; and $\sigma_{CSI-RS}^2$ is a power measured on Channel State Information-Reference Signal (CSI-RS) or cell-specific signals (CRS).

16. User equipment for operating in a wireless network, the user equipment comprising:
a network interface device to communicate with a base station having an antenna, the network interface device to receive a reference signal from the base station; and
a processor coupled to the network interface to control operation of the user equipment, the operation including calculating an optimum antenna tilt for the antenna based on a respective differential Reference Signal Received Power/Reference Signal Received Quality (RSRP/RSRQ) for the base station and transmitting feedback to the base station, the feedback including a beamforming indication of an indication of the optimum antenna tilt for the antenna.

17. The user equipment of claim 16 wherein the user equipment is a cellular telephone for operating in a $3^{rd}$ Generation Partnership Project Long Term Evolution (3GPP LTE)) network having multiple-input multiple-output (MIMO) enhancements.

18. The user equipment of claim 16 wherein the processor further controlling the operation of transmitting an antenna angle to the base station.

19. The user equipment of claim 16 wherein the processor is further to determine the optimum antenna tilt based on data throughput between the user equipment and the base station.

20. The user equipment of claim 16 wherein the processor is further to determine the optimum antenna tilt based on an un-quantized antenna tilt vector $\alpha$ where $\alpha$ is an Eigenvector corresponding to a maximum Eigenvalue of covariance of a composite channel as estimated by the processor using an elevational-reference signal (E-RS).

21. A system for operation in a wireless network, the system comprising:
a network interface device, including an antenna, to communicate with a base station having antennas, the network interface device to receive a reference signal from the base station;
memory to store data received from the base station; and
a processor, coupled to the network interface and the memory, to control operation of the system, the operation including calculating an optimum antenna tilt for the base station antennas based on a respective differential Reference Signal Received Power/Reference Signal Received Quality (RSRP/RSRQ) for the base station and transmitting feedback to the base station to enable beamforming of the base station antennas for further communication with the system, the feedback including an indication of the optimum antenna tilt for the base station antennas.

22. The system of claim 21 wherein the reference signal comprises a cell-specific reference signal (CRS), Channel State Information-Reference Signals (CSI-RS), or an elevation reference signal (E-RS).

* * * * *